Feb. 25, 1930.  H. SUNDSTEDT  1,748,252
AIRPLANE CONSTRUCTION
Filed July 17, 1926   6 Sheets-Sheet 2

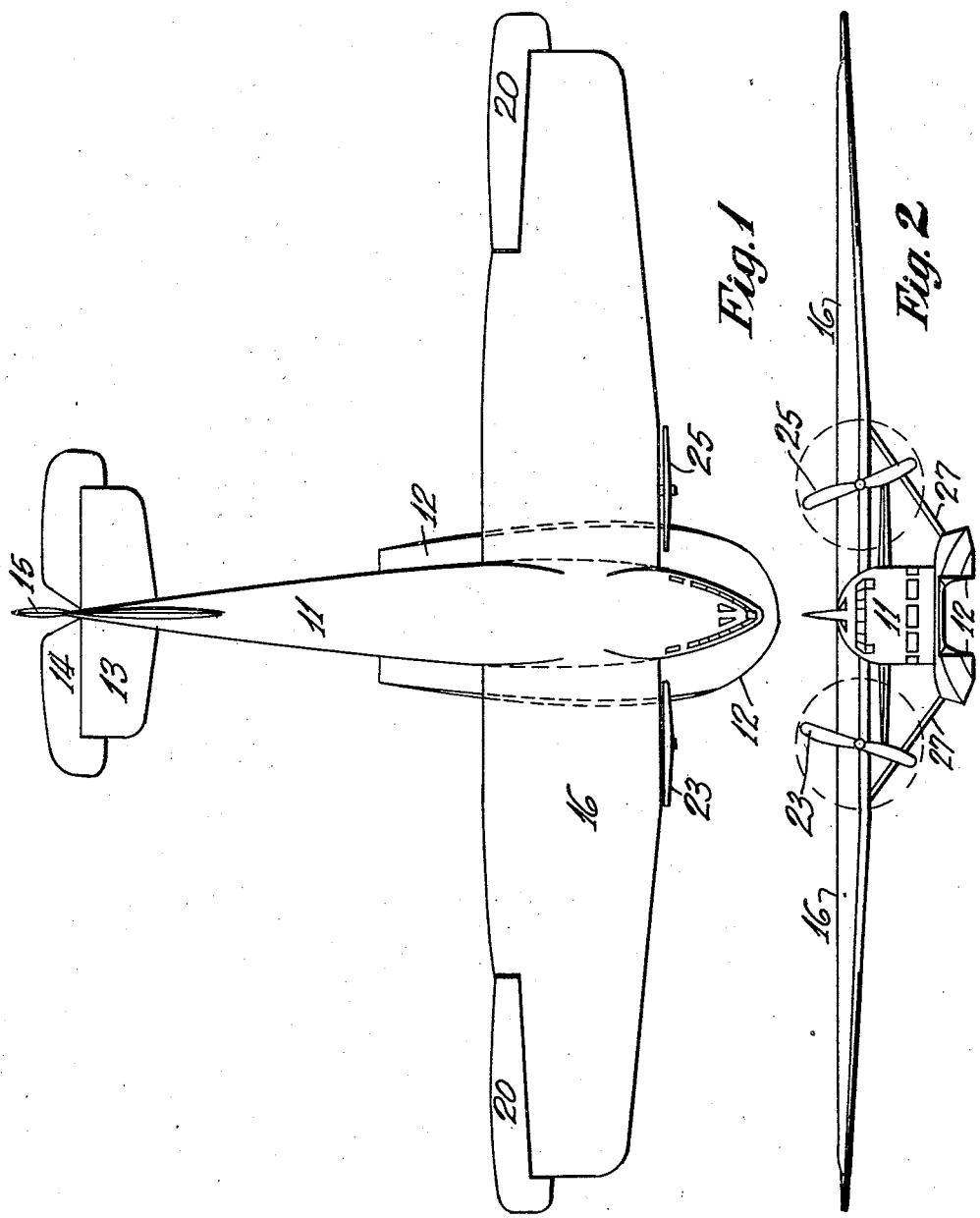

INVENTOR.
Hugo Sundstedt
BY
ATTORNEY.

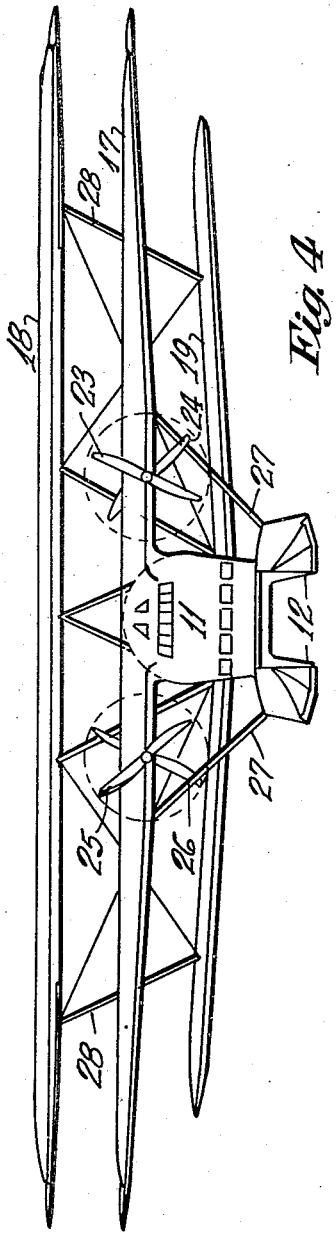
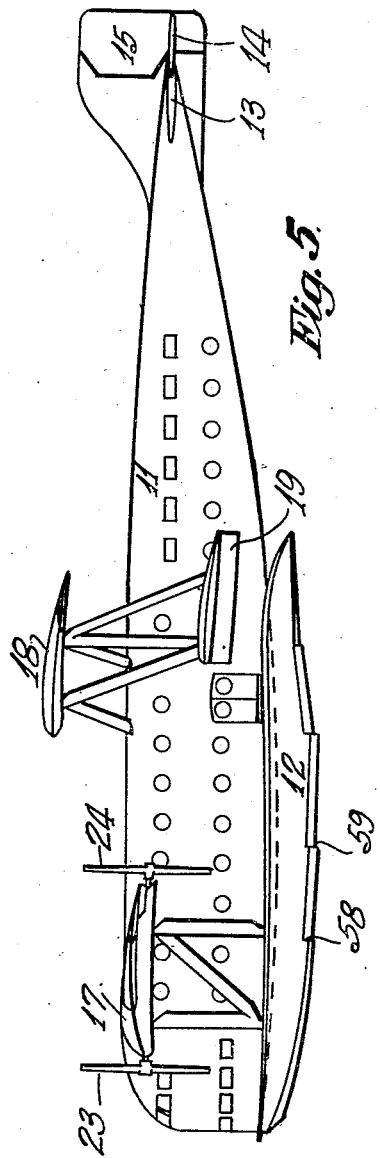

Feb. 25, 1930.  H. SUNDSTEDT  1,748,252
AIRPLANE CONSTRUCTION
Filed July 17, 1926   6 Sheets-Sheet 4

INVENTOR.
Hugo Sundstedt
BY
M. A. Laughridge
ATTORNEY.

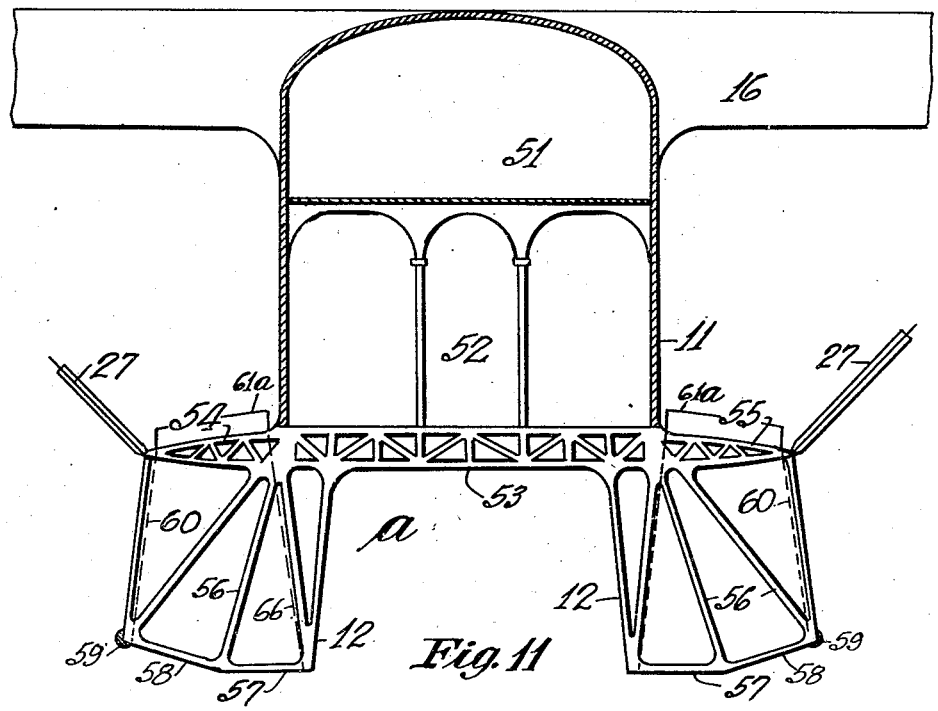
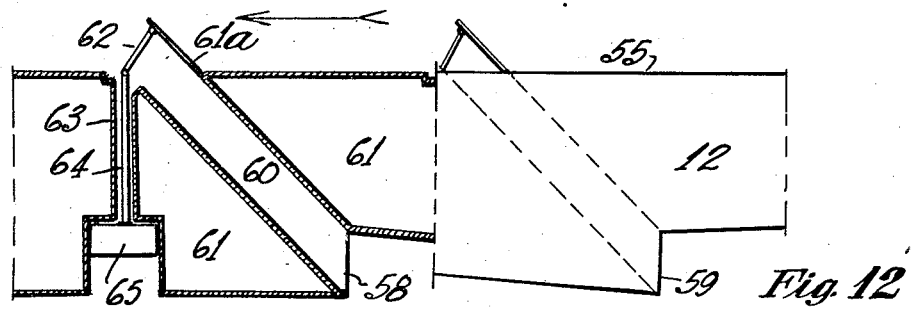

Patented Feb. 25, 1930

1,748,252

UNITED STATES PATENT OFFICE

HUGO SUNDSTEDT, OF NEW YORK, N. Y.

AIRPLANE CONSTRUCTION

Application filed July 17, 1926. Serial No. 123,053.

This invention relates to airplane constructions and includes certain novel features in the construction and arrangement of the wings, in the covering of the surfaces, in the construction of the pontoons and in the arrangement of the power system for operating the propellers. Other objects of the invention will be understood from the detailed description in the following specification and the drawings forming a part hereof, in which:

Fig. 1 is a plan view of a monoplane constructed according to my invention;

Fig. 2 is a front elevation of the monoplane in Fig. 1;

Fig. 4 is a front elevation of the machine shown in Fig. 3;

Fig. 5 is a side elevation of the machine shown in Fig. 3;

Fig. 11 is a cross-section of the body showing the pontoons;

Fig. 12 is a longitudinal section of the pontoons;

Figure 3:
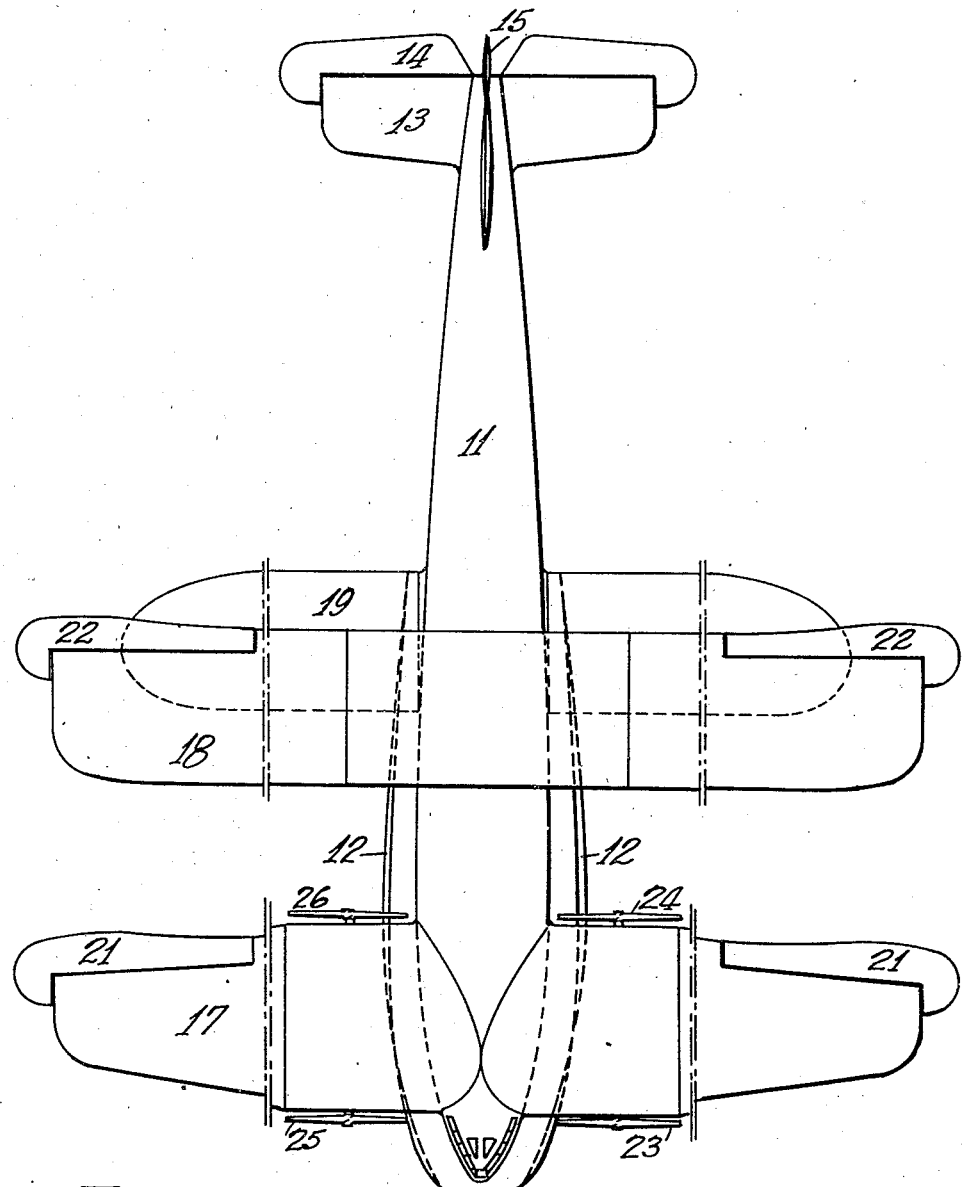
Fig. 3 is a plan view of a monoplane-biplane combination constructed according to my invention.

Most of the features of this invention may be used with any of the various types of aircraft in general use and, as herein shown and described, is applied to airplanes of large capacity and of the hydroplane type. The plane is driven by two or more propellers, supported by the wings and gear connected with the engines which are located in the fuselage. The larger machines are constructed with a single wing in front of the monoplane type and with a pair of wings in rear of the bi-plane type. These wings are curved in such a way that the air displacement by the front wing passes between the rear wings in a curve corresponding to the displacement of the rear wings, thereby increasing the lifting power and the efficiency of the plane.

A new covering material is used in the construction of these planes which has a smooth surface and which has the required strength and lightness necessary for this work. This covering comprises a pair of sheets of duralium or metal of the same class which are spaced apart by a board of balsa wood which has the necessary rigidity. This board may be comparatively thin, say not exceeding one-half inch and the sheets are glued thereto under pressure and are also held in place by the structural rivets used in assembling these boards in place.

The pontoons are constructed as an integral part of the fuselage or body and so arranged that the entire machine is balanced on the pontoons. The pontoons are provided with air ducts arranged obliquely in the direction in which the machine moves. These air ducts are provided with covers which are raised when the pontoons are in the water by a float and which are lowered when the machine is out of the water. The construction is so arranged that a strong current of air is forced into these air ducts under the base of the pontoon, thereby removing the suction of the pontoon on leaving the water. These air ducts are closed when out of the water and their air resistance removed.

Pontoons are provided, one on either side of the body, with a straight channel between them under the floor of the body. The other sides of the pontoons are curved to stream line formation. This construction will pass through the water without cross currents between the pontoons and therefore with a minimum resistance. The bottom of the pontoons has an upwardly sloping portion and a horizontal portion which planes on the surface of the water just before lifting.

The power system is derived from a number of power units driving a main shaft through automatic clutch couplings. This shaft, by suitable spur gears, drives counter shafts on the wings which are geared to the propeller shafts. The engines are located in the body below the plane of the front wing and centrally between the pontoons so that the centre of gravity of the machine is thereby lowered and stability is secured when the machine is resting on the pontoons. The gearing between the main shaft and the counter shafts enables the latter to be raised to the plane of the wings while the engines are on a lower horizontal plane.

The planes are provided with a propeller on each side of the body and for the larger sizes a propeller is provided on each side of the wing, perfectly mounted one in the rear of the other on the same shaft. However the propeller in the rear has a greater pitch than the propeller in front as it is operating through air in motion created by the front propeller.

Referring to the drawings, 11 is the fuselage or body of the plane which is provided with the pontoons 12, the tail 13, the horizontal rudder 14 and the vertical rudder 15 common to planes of this type. The wing 16 of the monoplane in Figs. 1 and 2 is developed from the top of the body as shown and is provided with the ailerons 20. This plane is provided with the propellers 23 and 25 mounted on the wing on either side of the body and the wing is braced by the struts 27—27 connecting between the wing and the edges of the pontoons 12.

The illustrations in Figs. 3, 4 and 5 shows a monoplane-biplane construction having the monoplane wing 17 in front and the biplane wings 18 and 19 in the rear. The wing 19 is shorter and smaller than wing 18. The wings 17 and 18 are provided with ailerons 21 and 22 as shown. This machine is provided with a pair of propellers on each side of the body as indicated at 23—24 and at 25—26. Bracing is used between the upper and lower wings in the rear as indicated at 28—28.

Figure 6:
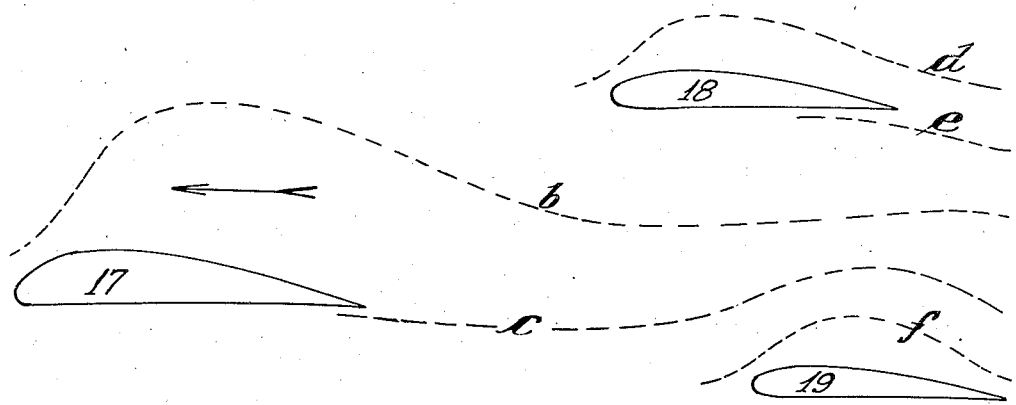
Fig. 6 is a graphic outline of the wing arrangement in Fig. 3.

The air displacement produced by this wing arrangement is shown in Fig. 6. It will be noted that the displacement produced by the front wing 17 as indicated by lines $b$ and $c$ passes between the rear wings 18 and 19 and conforms substantially to the displacement created by these wings indicated by lines $d$, $e$ and $f$ increasing the lifting effect of the wings. It should be noted that machines of the type shown have an unusually large wing area for the size of the machine and are adaptable for flight at high altitudes.

Figure 9:
Fig. 9 is an enlarged section of the covering.

The fabric forming the covering of the body, pontoons and wings is made from boards built up of balsa wood in thin stock and covered with light gage duralium or similar metal. This board Fig. 9 has a central portion 32 of balsa wood covered on both sides by the sheet metal plates 33 which are glued to the wood by any suitable adhesive, if necessary under pressure, to produce a light, strong board which will carry a comparatively heavy load and which has a certain degree of flexibility and rigidity. These boards can be jointed with a rabbeted edge as indicated in Fig. 9 and these edges may be soldered to produce a water-tight joint, as on the pontoons, or to produce an airtight joint in the body, as would be necessary in high altitudes where oxygen was used to sustain life in the plane.

Figure 7:
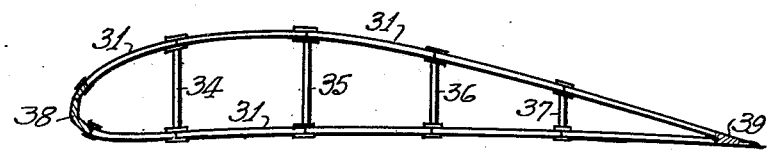
Fig. 7 shows the construction of a wing with an improved form of wing covering.
Figure 8:
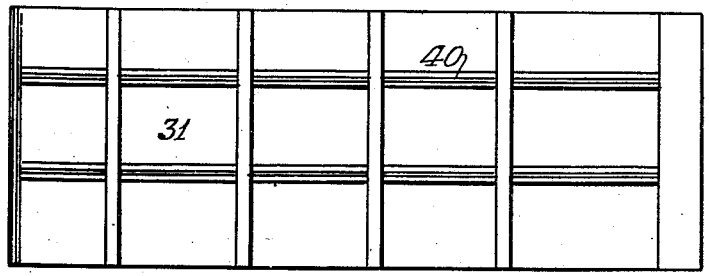
Fig. 8 is a plan view of the wing.
Figure 10:
Fig. 10 is a detail showing one method of attaching the covering.

The wing construction using this form of covering is shown in Figs. 7, 8 and 10. The boards 31 are supported by, and riveted to, the longitudinal ribs 34, 35, 36, and 37 of the wing and secured to the nose piece 38 and the rear edge 39. These boards are placed transverse of the wing and brace the longitudinal ribs together, and are flexible to form the curvature of the wing as shown. The transverse seams of the wing may be supported as shown in Fig. 10. The T 42 forms a channel for the boards and is supported by the ribs. The edges of the boards 31 are riveted to the T as indicated at 40.

The pontoon construction is shown in Figs. 11 and 12. The top part of the body 51 is the engine room, below this is the cabin 52 the floor of which is supported by the truss 53 which extends beyond the sides of the body at 54 and 55 and below these side extensions the pontoons 12 are built as an integral part of the body, thus avoiding isolated pontoons with their superstructure and added wind resistance. The pontoons are constructed with an internal frame work as indicated at 56 and have a base 57 sloping upwards at 58 so that the water pressure acting against 58 is in the direction of the corner of the body.

Part of the base is horizontal as shown at 57 and planes on the water just before lifting.

The space between the pontoons below the body is a straight channel as indicated at $a$ Fig. 13 enclosed by the straight inner side of the pontoons while the outer sides of the pontoons is of stream line formation. By using the straight channel $a$ it is apparent that there is no confusion of currents created by the sides of the pontoons to retard the progress of the plane on the water. The extreme clearance of the body is at the lower edge 59 of the pontoons which is reinforced to engage the bulkhead when docking. The wing struts 27 are secured to the truss 53 at the extreme edge of the pontoon thus securing a wide brace between the wing and the body.

As the pontoon lifts from the water considerable suction is created which must be overcome by the plane. The bottom of the pontoon is constructed in stages or steps on different elevations as at 58 and 59 which break up the continuous line of suction on the base. I provide an automatic ventilating arrangement passing on an incline from the top to the bottom of the pontoon across its entire width and terminating at each of these steps. This is best shown in the sectional view in Fig. 12, in which the pontoon is divided into hollow compartments 61 by the air duct 60. These compartments are usually used for the storage of fuel. The air duct 60 opens at 58 on the bottom of the pontoon and is normally closed by the lid 61ª except when in the water which raises the float 65 and the connection 64 passing through the tube 63 and by the link 62 maintains the lid open in the direction in which the plane is moving as indicated by the arrow. Thus, a current of air is caught by the lid 61ª and forced down the duct 60 to the surface of the water below the pontoon. This forces the water away from the bottom just before lifting and practically eliminates the suction. As soon as the pontoon is out of the water, the float 65, by gravity, lowers 61 and closes the duct 60 so that there is no air resistance from this part when in flight.

Figure 13:
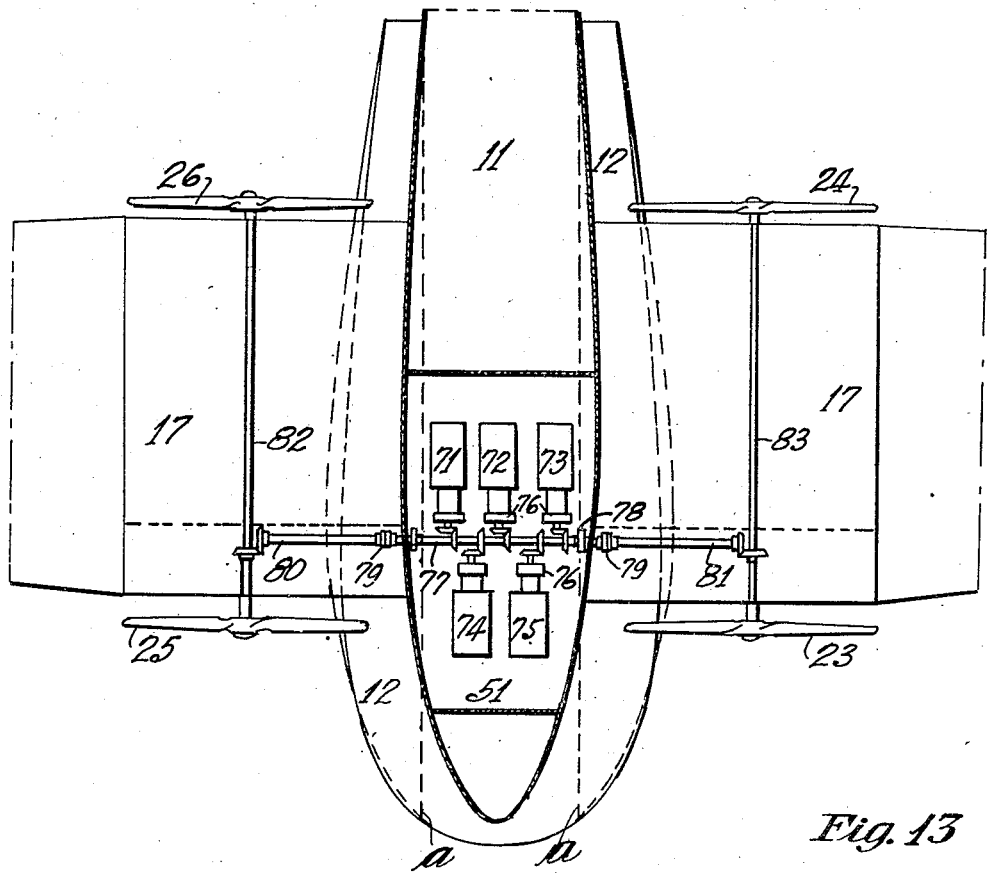
Fig. 13 is a plan view with the body in section showing the arrangement of the power system.
Figure 14:
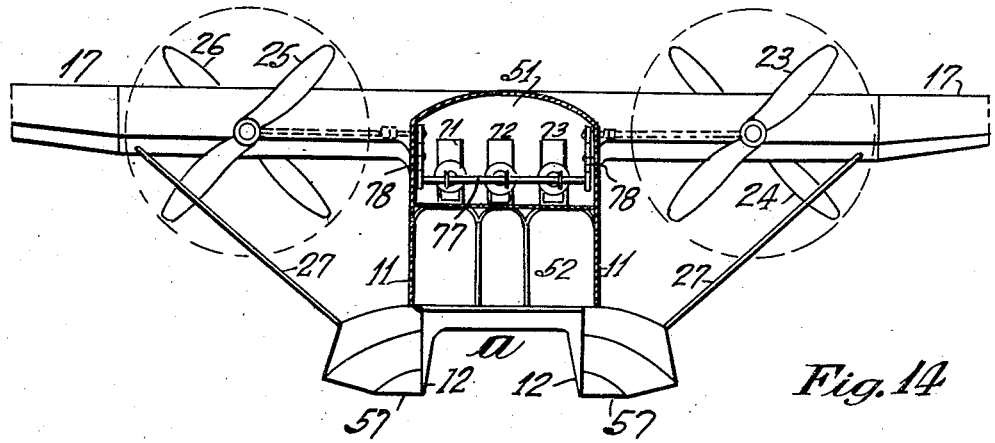
Fig. 14 is a front elevation, partly in section, showing arrangement of the power system.

The power system comprises the motors 71, 72, 73, 74 and 75 Fig. 13 which are each connected through slip clutches 76 by bevel gearing with the main shaft 77. This main shaft is connected by spur gears 78—78 on either side to the counter shafts 80 and 81 in the wing 17 through the couplings 79—79. The shaft 80 by bevel gears connects with the propeller shaft 82 transverse of the wing and upon which the propellers 25 and 26 are mounted. Similarly, the propeller shaft 83 is driven from the counter shaft 81 to drive the propellers 23 and 24 on the opposite side of the body.

Having thus described my invention, I claim:

1. In an airplane construction, the combination of a body supporting a wing structure, transverse trusses forming the supporting members for the floor of said body and projecting on either side from said body and a pair of pontoons substantially rectangular in shape built below said projections and braced internally from their corners diagonally to each of said trusses at the point where the truss leaves said body.

2. In an airplane construction, the combination of a body supporting a wing structure, a pontoon for supporting said body on the water, a ventilator passing through said pontoon from top to bottom and means on top of said pontoon for automatically diverting an air current through said ventilator when the pontoon is on the water and for preventing said air current when the pontoon rises off the water.

3. In an airplane construction, the combination of a body supporting a wing structure, a pontoon for supporting said body on the water, a ventilator passing through said pontoon from top to bottom and a closure on top of said pontoon for said ventilator arranged when in the closed position to be flush with the body of the pontoon.

4. In an airplane construction, the combination of a body supporting a wing structure, a pontoon for supporting said body on the water, a ventilator passing through said pontoon from top to bottom and a closure for said ventilator so arranged that when open it rises above the top of said pontoon and directs a current of air into said ventilator and when closed is in line with the body of the pontoon.

5. In an airplane construction, the combination of a body supporting a wing structure, a pontoon for supporting said body on the water, a ventilator passing through said pontoon from top to bottom, a closure for top of said ventilator and means operated by the pressure of the water for controlling said closure.

6. In an airplane construction, the combination of a body supporting a wing structure, a pontoon for supporting said body on the water, a ventilator passing through said pontoon from top to bottom, a closure for said ventilator, and a float for operating said closure.

7. In an airplane construction, the combination of a fuselage supporting a wing structure, with a pair of pontoons placed one on each side of the fuselage and connected throughout their length with the fuselage and transverse trusses forming the supporting members of the floor of said fuselage and projecting on either side from said fuselage to form the top supporting members of said pontoons.

Signed at New York, in the county of New York and State of New York, this 29th day of June, A. D. 1926.

HUGO SUNDSTEDT.